(No Model.)
W. SIMON.
CONDUIT ELECTRIC RAILWAY.
No. 534,454.  Patented Feb. 19, 1895.
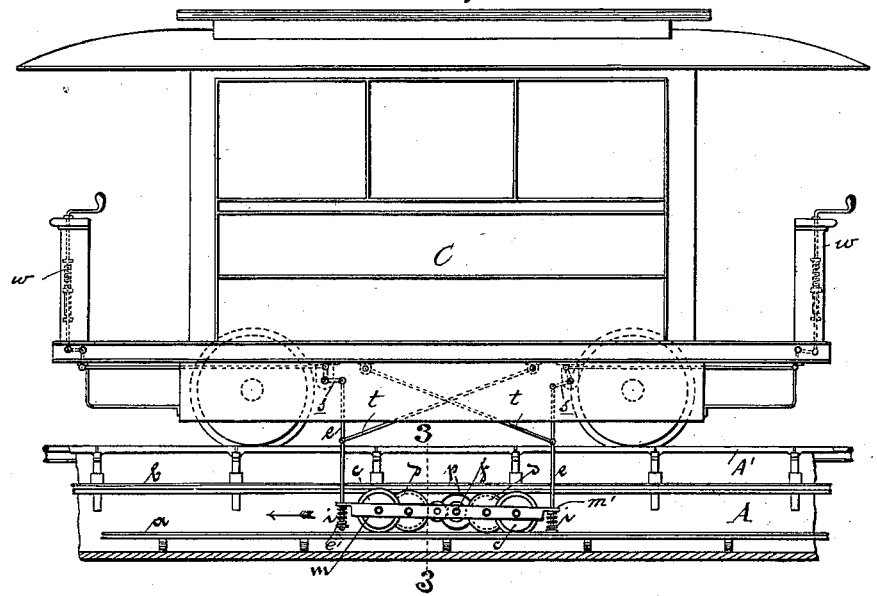
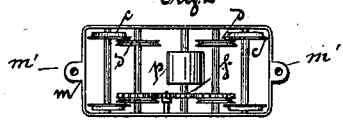
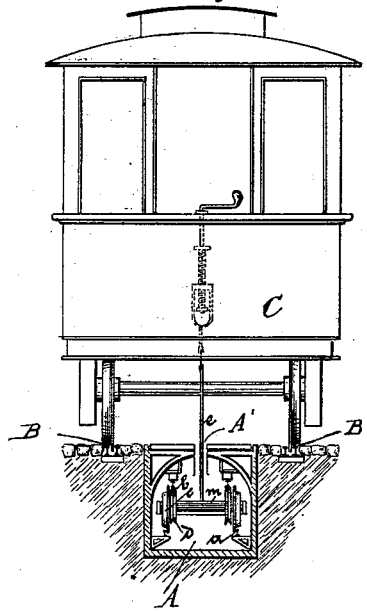
Witnesses:
Alex Wiele. Ing.
Max Scheidig.
Inventor:
Wilhelm Simon

UNITED STATES PATENT OFFICE.

WILHELM SIMON, OF NUREMBERG, GERMANY.

CONDUIT ELECTRIC RAILWAY.

SPECIFICATION forming part of Letters Patent No. 534,454, dated February 19, 1895.

Application filed March 3, 1894. Renewed January 11, 1895. Serial No. 534,594. (No model.)

*To all whom it may concern:*

Be it known that I, WILHELM SIMON, a citizen of the German Empire, and a resident of Nuremberg, Germany, have invented certain new and useful Improvements in Electric Railways, of which the following is a specification.

This invention relates to improvements in electric railways having the conductors located in a conduit buried in the street; and the object of my invention is to provide an electric railway of this kind in which the conductors are so located that contact cannot be made with the same by any object or person on the street except from a car and which conductors are well protected.

The invention consists in the combination with a conduit of supporting and conductor rails in the same, a motor carriage in the conduit, combined contact and driving wheels on the carriage and geared with the motor on the carriage and means for bringing said wheels in contact with the conductor rails.

The invention also consists in the construction and combination of parts and details as will be fully described hereinafter and finally pointed out in the claims.

In the accompanying drawings:—Figure 1 is a side view of a car of my improved electric railway, the conduit being shown in longitudinal section and the motor carriage in the same in side view. Fig. 2 is a plan view of the motor carriage. Fig. 3 is an end view of the car and motor carriage, the conduit being shown in transverse section on the line 3—3, Fig. 1.

Similar letters of reference indicate corresponding parts.

The motor carriage $m$ is provided with a pair of supporting wheels $c$ at each end, which wheels run on the rails $a$ arranged in the bottom part of the conduit A located in the street pavement between the rails B and having the usual longitudinal top slot A'. Two current conductor rails $b$ are secured to the top of the conduit and along the same the two pairs of contact and friction or driving wheels $d$ on which the motor carriage can run. The shafts on which the contact wheels $d$ are rigidly mounted are driven by gearing from an electric-motor $p$, mounted on the motor-carriage in such a manner that the wheels of the opposite ends of the motor-carriage rotate in opposite directions.

Two rods $e$ passing through the conduit slot A' pass through apertured lugs $m'$ $m'$ on the ends of the motor-carriage frame and are surrounded below said lugs by helical springs $i$, which in turn rest on the bottom heads $e'$ of the rods $e$.

The upper ends of the rods $e$ are pivotally connected with angle-levers $s$ pivoted on the under side of the car and connected by means of suitable devices with the vertical crank shafts or levers $w$ on the ends of the car.

Brace-rods $t$ are pivoted to the floor of the car C and to the rods $e$.

When the car is to be started the shaft or lever $w$ at that end of the car toward the direction in which the car is to travel is operated to raise the corresponding end of the motor-carriage, whereby the wheels $d$ at the raised end of the carriage $m$ are brought in frictional contact with the conductor-rails $b$, the corresponding wheels $c$ being lifted off the rails $a$ and the wheels $c$ at the opposite end of the carriage trailing on the rails $a$. As soon as the contact is thus established between the conductor rails $b$ and the wheels $d$ the electric-motor is started and according to the greater or less friction between the said wheels $d$ and the conductor-rails $b$ the speed of the motor-carriage increases or decreases, and by means of the rods $e$ and brace-rods $t$ the car C is pulled along by the motor-carriage. As soon as the friction between the wheels $d$ and conductor-rails $b$ is decreased by slightly lowering the raised end of the motor-carriage, the speed of the car decreases and when the raised end of the motor-carriage is lowered upon the rails $a$ the circuit is broken and the cars stop.

When the car is to run in opposite direction the opposite end of the motor-carriage is raised in the manner described.

The springs $i$ prevent undue jars and jolts while raising or lowering either end of the motor-carriage.

Having thus described my invention, I claim as new and desire to secure by Letters Patent—

1. The combination with a conduit having supporting and conductor-rails, a motor-carriage in the conduit and upon the supporting-rails, an electric-motor on said carriage combined contact and motor-wheels on said carriage and means for raising one end of the carriage and bringing the contact wheels in contact with the conductor-rails, substantially as set forth.

2. The combination with a conduit having supporting and conductor-rails, of a motor carriage in the conduit, a car above the conduit from which conduit the ends of the motor carriage are suspended, means for raising either end of the carriage from the car, an electric motor on said carriage and combined contact and driving wheels on said carriage and in gear with the motor, substantially as set forth.

3. The combination with a conduit having supporting and conductor rails of a motor carriage in the conduit, a car above the conduit from which car both ends of the motor carriage are suspended, means for raising either end of the motor carriage from the car, an electric motor on said carriage, a set of combined contact and driving wheels at each end of the car and gearing for rotating said sets of wheels in opposite direction from the motor, substantially as set forth.

In testimony that I claim the foregoing as my invention I have signed my name in presence of two subscribing witnesses.

WILHELM SIMON.

Witnesses:
ALEX. WIELE,
MAX SCHEIDIG.